(12) United States Patent
Kuronuma

(10) Patent No.: US 8,867,055 B2
(45) Date of Patent: Oct. 21, 2014

(54) READING APPARATUS AND PRINTING APPARATUS COMPRISING A PRESSER PLATE, A SENSOR, AND A CARRIAGE

(71) Applicant: Canon Kabushiki Kaisha, Tokyo (JP)

(72) Inventor: Daigo Kuronuma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/683,392

(22) Filed: Nov. 21, 2012

(65) Prior Publication Data

US 2013/0135650 A1 May 30, 2013

(30) Foreign Application Priority Data

Nov. 25, 2011 (JP) ................................. 2011-257425

(51) Int. Cl.
*G06K 15/00* (2006.01)
*H04N 1/04* (2006.01)
*G01J 3/50* (2006.01)
*H04N 1/00* (2006.01)
*G01J 3/02* (2006.01)

(52) U.S. Cl.
CPC . *G06K 15/00* (2013.01); *G01J 3/50* (2013.01); *H04N 1/00602* (2013.01); *G01J 3/0291* (2013.01); *H04N 1/00559* (2013.01); *H04N 1/00053* (2013.01); *H04N 1/00591* (2013.01); *H04N 1/04* (2013.01); *H04N 1/00045* (2013.01); *H04N 2201/0456* (2013.01); *H04N 1/00588* (2013.01); *H04N 1/00015* (2013.01); *H04N 2201/02402* (2013.01); *H04N 2201/02404* (2013.01); *H04N 1/00031* (2013.01); *G01J 3/027* (2013.01); *H04N 1/00023* (2013.01)

USPC .......................................... 358/1.13; 358/474

(58) Field of Classification Search
CPC ............................. B41J 2/2142; H04N 1/0464
USPC ........................................ 358/1.13, 474–498
See application file for complete search history.

(56) References Cited

U.S. PATENT DOCUMENTS

| | | | |
|---|---|---|---|
| 5,416,613 A | 5/1995 | Rolleston et al. | |
| 7,864,783 B2 | 1/2011 | Brewer et al. | |
| 8,320,030 B2 | 11/2012 | Kimura | |
| 8,508,818 B2 | 8/2013 | Tohnai | |
| 2007/0243278 A1* | 10/2007 | Anelli et al. | 425/365 |
| 2009/0034027 A1 | 2/2009 | Yoshimoto et al. | |
| 2010/0110435 A1* | 5/2010 | Onishi | 356/402 |
| 2010/0245950 A1* | 9/2010 | Osakabe | 358/498 |
| 2013/0135426 A1 | 5/2013 | Wakayama | |

FOREIGN PATENT DOCUMENTS

| | | |
|---|---|---|
| JP | 2008-254221 A | 10/2008 |
| JP | 2008-281549 A | 11/2008 |
| JP | 2010-133915 A | 6/2010 |

OTHER PUBLICATIONS

U.S. Appl. No. 13/683,304, filed Nov. 21, 2012, Masaki Sumioka.

(Continued)

*Primary Examiner* — Qian Yang
(74) *Attorney, Agent, or Firm* — Canon USA Inc IP Division

(57) ABSTRACT

A movable carriage includes a mechanism configured to hold a sensor unit so as to allow the sensor unit to displace with respect to the carriage. The mechanism allows the sensor unit to displace with respect to the carriage in a rotational direction centering on a shaft parallel to a moving direction of the carriage and disposed above a reading area of the sensor unit, and in a vertical direction.

14 Claims, 16 Drawing Sheets

(56) References Cited

OTHER PUBLICATIONS

U.S. Appl. No. 13/683,328, filed Nov. 21, 2012, Takeshi Koda.
U.S. Appl. No. 13/683,366, filed Nov. 21, 2012, Masaki Sumioka.
U.S. Appl. No. 13/683,423, filed Nov. 21, 2012, Naoki Wakayama.
U.S. Appl. No. 13/683,450, filed Nov. 21, 2012, Masaki Sumioka.
Canon Inc., imageRUNNER ADVANCE 6075/6065/6055 Quick Reference, 2010, pp. 45-46, Tokyo JP.

* cited by examiner

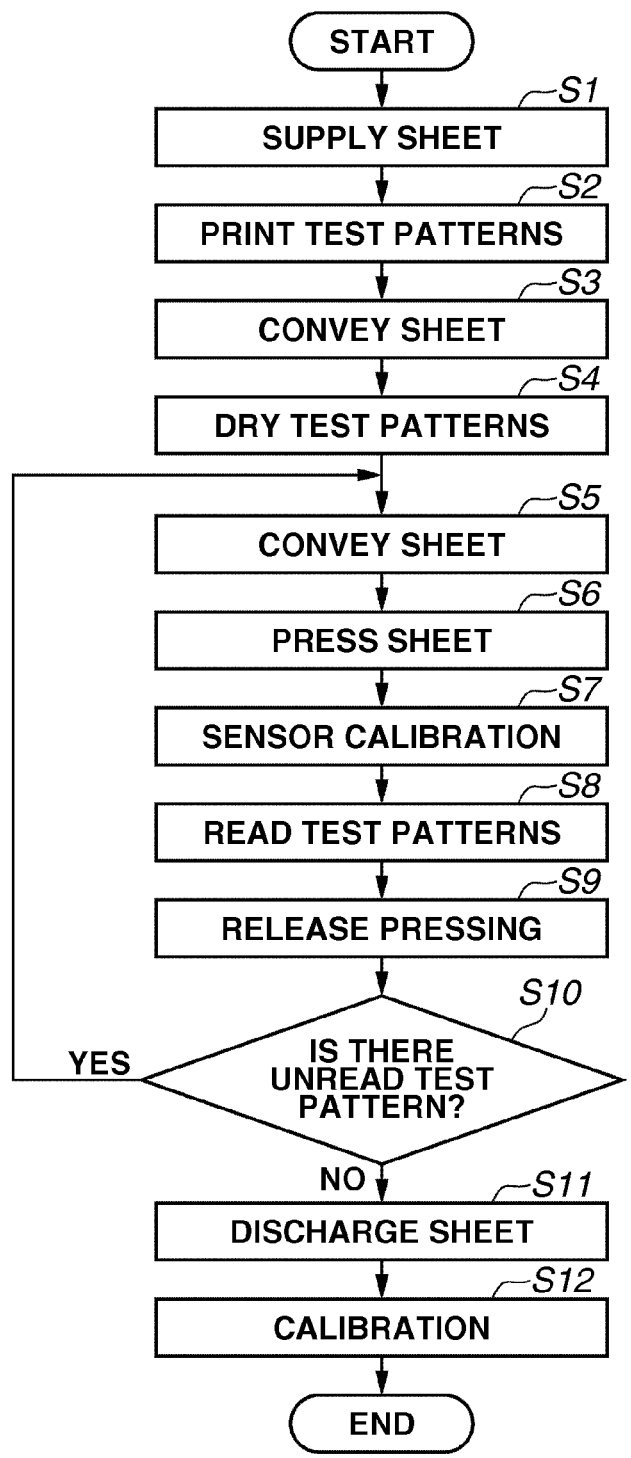

READING APPARATUS AND PRINTING APPARATUS COMPRISING A PRESSER PLATE, A SENSOR, AND A CARRIAGE

BACKGROUND OF THE INVENTION

1. Field of the Invention

The present invention relates to a reading apparatus for reading a pattern formed on a sheet, and a printing apparatus including the reading apparatus.

2. Description of the Related Art

Japanese Patent Application Laid-Open No. 2010-133915 discuses an ink jet printer including a colorimetric apparatus. This colorimetric apparatus performs colorimetry of a printed color pattern for color calibration and, based on colorimetric data, adjusts colors of a color image to be subsequently printed, thus reproducing desired colors. The printer records color patches as a color pattern for color calibration, and then the colorimetric apparatus performs colorimetry of the color patches with a colorimetric sensor moving in the sheet width direction.

When a carriage moves for reading, it is desirable to keep constant the distance between the sensor unit and the sheet and the posture of the sensor unit with respect to the sheet. With the printing apparatus discussed in Japanese Patent Application Laid-Open No. 2010-133915, the sensor unit is connected with the carriage by a connection mechanism, which allows the sensor unit to minutely rotate.

The connection mechanism for connecting the carriage and the sensor unit discussed in Japanese Patent Application Laid-Open No. 2010-133915 is a parallel link mechanism composed of two link plates on each side, a total of four link plates. Basically, the parallel link mechanism vertically moves the sensor unit with respect to the carriage. With the connection mechanism discussed in Japanese Patent Application Laid-Open No. 2010-133915, a plurality of shafts of the parallel link mechanism is loosely engaged with respective holes in an intentional way to provide "backlash". This configuration enables the sensor unit to rotate within a minute range allowed by backlash, with respect to the carriage centering on two axes in parallel with the sheet.

With the connection based on such a loose parallel link mechanism, however, when the carriage moves, the sensor unit connected with the carriage shakes, thus degrading the positional accuracy of a colorimeter holder. In addition, when the carriage moves in an acceleration or deceleration motion, each link plate of the parallel link mechanism receives force to bend. Therefore, the positional accuracy of the sensor unit is also degraded by the bending of the link plates. If the positional accuracy of the sensor unit degrades, a small-sized color pattern cannot be read.

This means that, with the printing apparatus configuration discussed in Japanese Patent Application Laid-Open No. 2010-133915, it is required to increase the size of color patches to be formed on the sheet. Therefore, the sheet consumption required for color calibration increases, and the amount of sheet conveyance in color calibration increases, thus resulting in an increase in time period required for color calibration.

SUMMARY OF THE INVENTION

An example of the present invention is directed to a simply-structured reading apparatus capable of reading information on a sheet with high accuracy, and a printing apparatus including the reading apparatus.

According to an aspect of the present invention, a reading apparatus includes: a presser configured to press a sheet onto a supporting surface; and a carriage configured to hold a sensor unit configured to read information on the sheet, and to move along a surface of the presser, wherein the carriage includes a mechanism configured to hold the sensor unit so as to allow the sensor unit to displace with respect to the carriage, and wherein the mechanism allows the sensor unit to displace with respect to the carriage in a rotational direction centering on a shaft parallel to a moving direction of the carriage and disposed above a reading area of the sensor unit, and in a vertical direction.

According to an exemplary embodiment of the present invention, there are provided a simply-configured reading apparatus not having a complicated mechanism, such as a parallel link mechanism, capable of reading information on a sheet with high accuracy, and a printing apparatus including the reading apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 is a flowchart illustrating an operating sequence of the printing apparatus.

DESCRIPTION OF THE EMBODIMENTS

Various exemplary embodiments, features, and aspects of the invention will be described in detail below with reference to the drawings.

Figure 1:
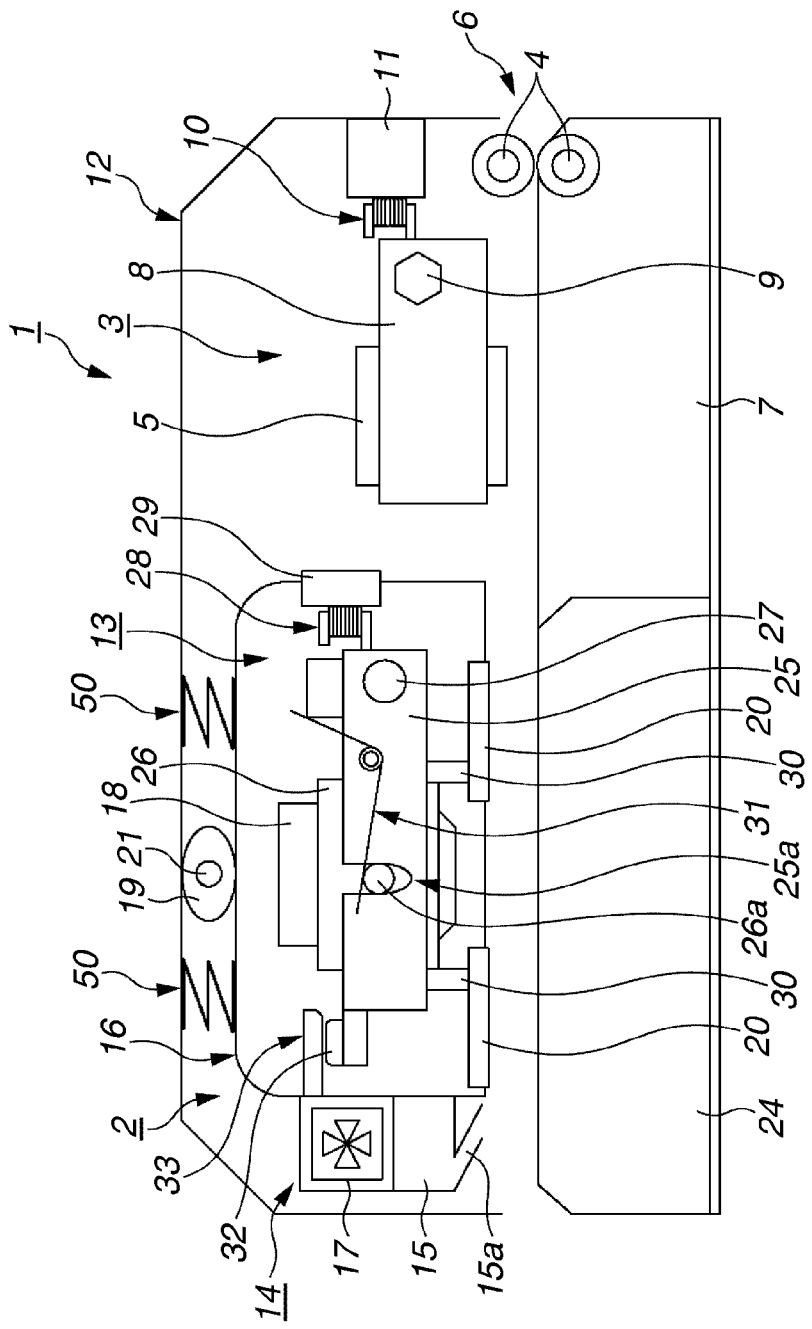
FIG. 1 is a side view illustrating a configuration of a printing apparatus according to an exemplary embodiment.
Figure 2A:
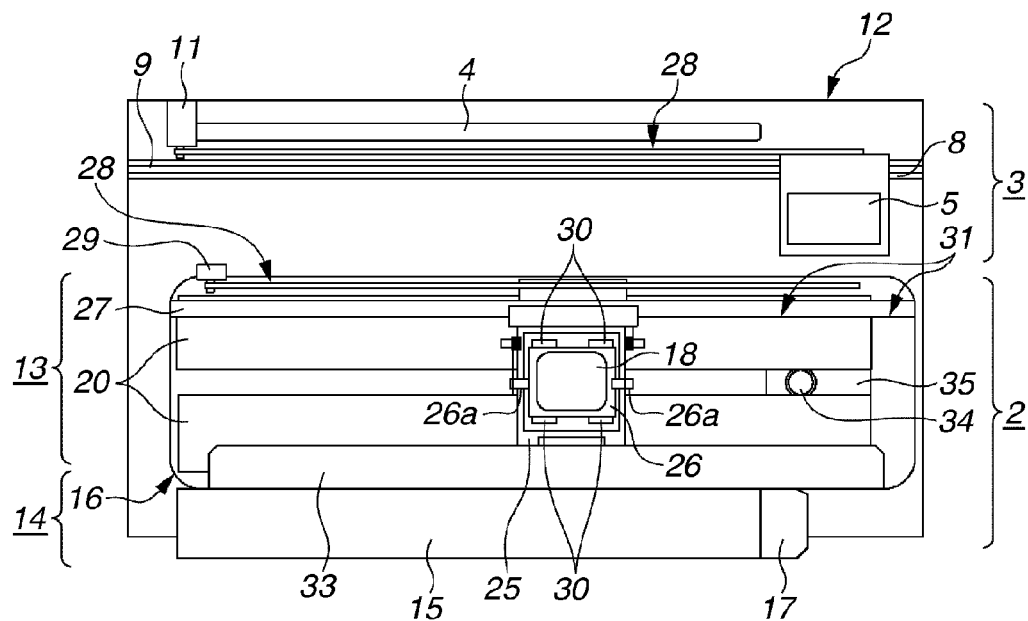
FIGS. 2A and 2B are top views illustrating the configuration of the printing apparatus according to an exemplary embodiment.
Figure 2B:
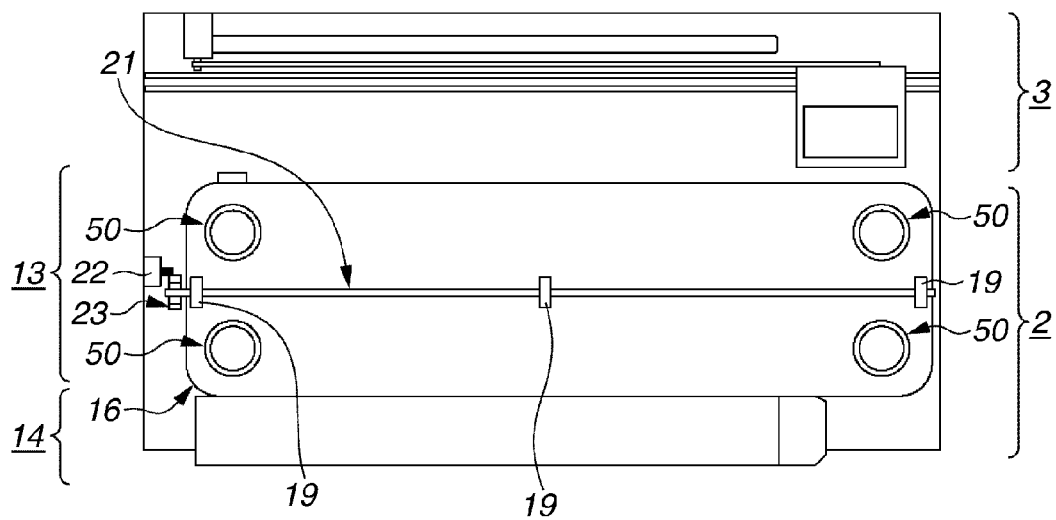

An ink jet printing apparatus as a printing apparatus according to exemplary embodiments of the present invention will be described below. FIG. 1 is a side view illustrating a configuration of a printing apparatus according to the present exemplary embodiment. FIGS. 2A and 2B are top views illustrating the printing apparatus illustrated in FIG. 1. FIG. 2A illustrates a configuration of a lower portion of a reading unit. FIG. 2B illustrates a configuration of an upper portion of the reading unit.

A printing apparatus 1 includes a reading unit 2, a printing unit 3, a conveyance unit 4, a platen 7, and a backing 24. A sheet feed unit supplies a sheet. A conveyance roller of the conveyance unit 4 conveys the sheet on the platen 7. The printing unit 3 prints an image and a test pattern on the sheet. The reading unit 2 reads the test pattern printed on the sheet for the purpose of colorimetry. Test pattern refers to a color pattern, such as color patches for color calibration, and a pattern for inspecting any non-discharge state of each nozzle. When all of the test patterns have been read, the sheet is discharged to the outside of the printing apparatus 1. In the present specification, at any position in the sheet conveyance path, the side toward the sheet feed unit is referred to as "upstream" and the opposite side is referred to as "downstream".

The printing unit 3 includes an ink jet print head 5, and a reciprocally movable carriage 8 for mounting the print head 5. The print head 5 is fixed to the carriage 8 so that the ink discharging nozzle faces the sheet. The carriage 8 is pivoted by a guide shaft 9. When a drive belt 10 fixed to the carriage 8 is rotated by a head carriage motor 11, the carriage 8 reciprocally moves along a second direction perpendicularly intersecting with a first direction (sheet conveyance direction). The head carriage motor 11 is fixed to a frame 12 of the printing apparatus 1. When printing an image or a test pattern, the printing apparatus 1 repeats step-feed of the sheet S and image formation for one band. In image formation for one band, the print head 5 discharges ink while the carriage 8 is reciprocally moving in the second direction with respect to the sheet S.

The reading unit 2 scans a test pattern printed on the sheet S to acquire color information, and automatically performs colorimetry. The reading unit 2 includes a scanner unit 13 and a drying unit 14.

The scanner unit 13 reciprocally moves a sensor unit 18 along the surface of the sheet S to read an image. In the scanner unit 13, a carriage 25 is supported by a guide shaft 27. Similar to the above-described carriage 8, the carriage 25 is driven by a motor 29 (drive source) and a drive belt 28 to reciprocally move in the second direction. The range of the reciprocal motion of the carriage 25 covers the sheet width, which is, for example, 60 inches. When performing colorimetry, the sensor unit 18 mounted on the carriage 25 reads a test pattern while the carriage 25 is reciprocally moving in the second direction with respect to the sheet S.

The drying unit 14 promotes the dryness of ink applied to the sheet S before reading by the reading unit 2. The drying unit 14 includes a blower unit 17 including a heater and a drying fan, and a duct 15 for sending warm air generated by the blower unit 17 to the surface of the sheet S. The blower unit 17 may not necessarily include both the heater and the drying fan, and may not include either one as long as the blower unit 17 exhibits the required drying capability. An end of the duct 15 is an air outlet 15a. The air outlet 15a, having a width equal to or larger than the width of the sheet S to be dried, blows off warm air to simultaneously dry the entire area of the sheet S directly under the air outlet 15a.

Figure 3:
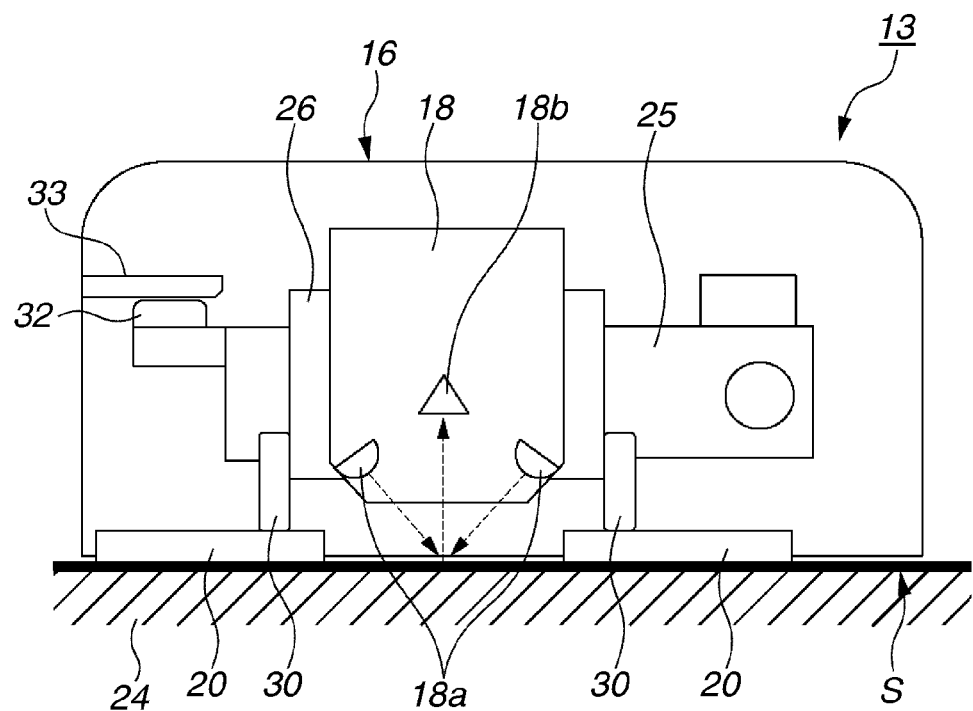
FIG. 3 is a cross sectional view illustrating a configuration of a scanner unit.
Figure 4:
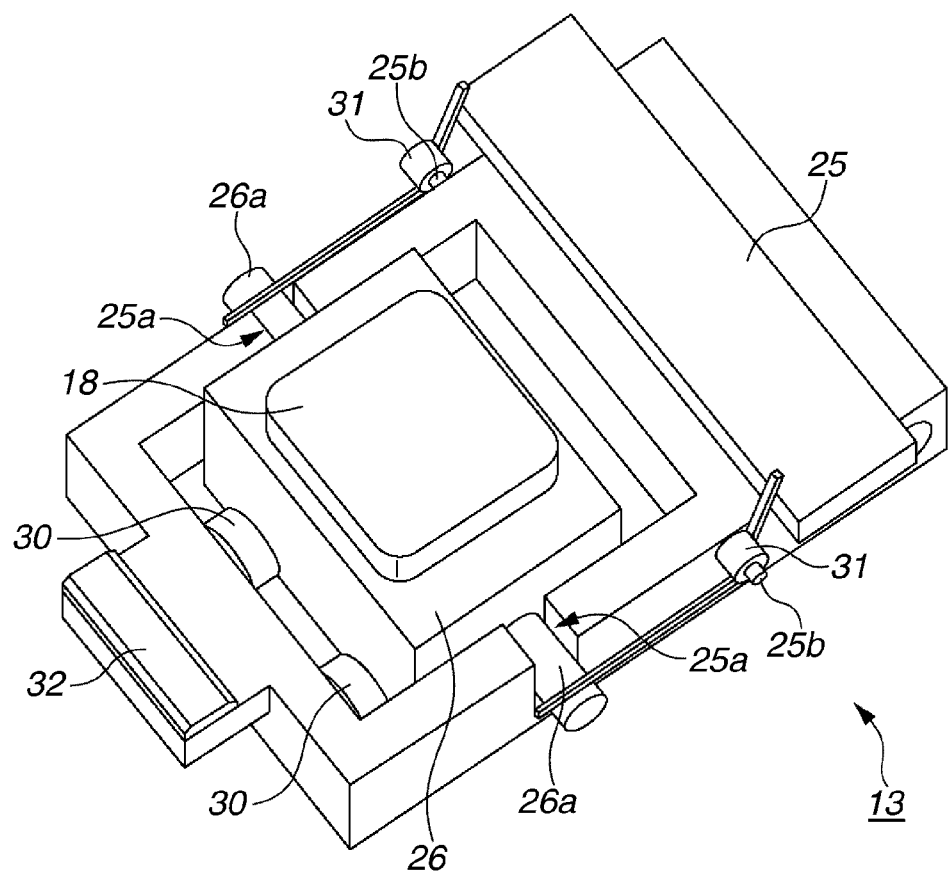
FIG. 4 is a perspective view illustrating the configuration of the scanner unit.

FIG. 3 is a cross sectional view illustrating a configuration of the scanner unit 13. FIG. 4 is a perspective view illustrating the scanner unit 13. The scanner unit 13 includes the sensor unit 18, and the carriage 25 holding the sensor unit 18 and reciprocally moving on a presser plate 20. The sensor unit 18 is retained by a sensor holder 26 to form a sensor unit. The sensor holder 26 is supported by a mechanism which allows the displacement in a rotational direction centering on the first direction and in the vertical direction with respect to the carriage 25. This mechanism will be described in detail below.

The sensor unit 18 includes two light sources 18a and a light-sensitive element 18b. In the printing unit 3, the light sources 18a irradiate with light the test pattern formed on the sheet S, and the light-sensitive element 18b receives light reflected by the test pattern, from different directions. Information about the density and colors of the test pattern is acquired based on the signal strength of the light-sensitive element 18b. The light sources 18a and the light-sensitive element 18b may be disposed in reverse.

When reading the test pattern on the sheet S, the presser plate 20 presses the sheet S against the supporting surface of the backing 24. A slit (an opening oblong along the second direction) is formed over a predetermined range corresponding to the reading area of the sheet S. Light passes through the slit for reading. The presser plate 20 is provided with first and second portions having an oblong shape extending within a predetermined range in a direction parallel to the second direction. The first and second portions are disposed on the upstream and downstream sides of the reading position, respectively. The first and second portions may be different portions of one presser plate or portions of two divided plates.

At a slit between the first and second portions of the presser plate 20, a calibration member 34 for calibrating the reading characteristics of the sensor unit 18 (sensor calibration) is attached at an end of the reciprocal stroke of the carriage 25. The calibration member 34 is retained by a holder 35. The attachment structure of the calibration member 34 and sensor calibration procedures will be described in detail below.

The bottom of the sensor holder 26 is provided with a first contact member which contacts the surface of the first portion when the carriage moves, and a second contact member which contacts the surface of the second portion when the carriage moves. More specifically, wheel-like rotating members 30 (contact members) are provided at four position on the bottom surface of the sensor holder 26. When the carriage 25 moves in the second direction along with the guide rail 27, the rotating members 30 contacting the upper surface of the presser plate 20 are rotatably driven to run thereon. Contact members may not necessarily be rotating members, and may be sliding members having a small friction coefficient which do not rotate.

To guide the reciprocal movement of the carriage 25 in the second direction, another guide unit different from the guide shaft 27 is provided. Specifically, a slider 32 is attached to the carriage 25 and a guide rail 33 is attached to the inner wall of the frame 12. Guide surfaces of the slider 32 and the guide rail 33 contact and slide across each other.

A spring member 31 is an urging member for urging the sensor holder 26 downwardly in the gravity direction with respect to the carriage 25, based on elastic force. The spring member 31 is attached with the same structure at two different positions: on the front and rear surfaces of the carriage 25 in the second direction. The spring member 31 will be described in detail below.

The above-described members stored in the housing 16 are integrally included as one unit, forming the scanner unit 13.

The above-described drying unit 14 is integrally included downstream of the housing 16.

As illustrated in FIGS. 1 and 2A and 2B, an elevating mechanism for moving the scanner unit 13 up and down (raised state and lowered state, respectively) is provided between the upper surface of the housing 16 of the scanner unit 13 and the bottom surface of the frame 12 of the printing apparatus 1. The elevating mechanism includes an elevating motor 22 (drive source), a gear 23, a rotation shaft 21, and three elevating cams 19 rotating centering on the rotation shaft 21. The elevating mechanism further includes four spring members 50 (tension springs) for pulling up the scanner unit 13 (housing 16), which are provided at four positions as illustrated in FIG. 2B.

When the elevating mechanism changes the reading unit 2 from the raised state to the lowered state, the sheet S conveyed directly under the sensor unit 18 for test pattern reading is pinched and fixed between the bottom surface of the presser plate 20 and the supporting surface of the backing 24.

To maintain a high reading accuracy with the sensor unit 18, it is desirable to maintain the relative distance and relative angle between the sensor unit 18 and the surface of the sheet S facing the sensor unit 18 within a predetermined range. Actually, however, the sheet S may absorb moisture in ink or air, thus resulting in waving (cockling). When the sheet S is roll paper, it may have a tendency to be curled. This means that the surface of the sheet S is not necessarily flat. Therefore, during reading, the presser plate 20 presses the sheet S against the backing 24 to flatten the sheet S. Since the slit formed on the presser plate 20 is an opening, a portion of the sheet S facing the opening cannot be pressed. However, since the width of the slit 7b (in the first direction) is very narrow, pressing the sheet S by both edges of the slit enables sufficiently correcting floating portions of the sheet S in the reading area.

The presser plate 20 is an easily-deformable flexible member made of such a material as an acrylonitrile-butadiene-styrene (ABS) resin or a polycarbonate (PC) resin having a thickness of about 1 to 3 mm to prevent damage to the surface of the sheet S (particularly, a portion on which a test pattern P is formed). On the other hand, the backing 24 is made of a rigid body. The supporting surface of the backing 24 has higher stiffness than the presser plate 20. When the presser plate 20 presses the sheet S, both the sheet S and the presser plate 20 are made into a shape along the surface shape (flat surface) of the backing 24.

If the sheet S is strongly curled or cockled, a part of the flexible presser plate 20 may be lifted by a floated portion of the sheet S, possibly resulting in imperfect adhesion of the sheet S. Even in this case, in the vicinity of portions where the rotating members 30 ride on the upper surface of the presser plate 20, the rotating members 30 intensively press the presser plate 20 by the sum total of the weight of the sensor unit 18 and the urging force of the spring members 31. Therefore, floating of the sheet S from the backing 24 is resolved in the vicinity of the reading position. Thus, high reading accuracy is maintained.

A mechanism for holding the sensor holder 26 to the carriage 25 to allow the sensor unit 18 to displace with respect to the carriage 25 will be described in detail below with reference to FIGS. 4 and 5.

In this mechanism, a shaft is engaged with a vertically long hole. A shaft 26a having a predetermined diameter, a rotation shaft parallel to the first direction, is attached to each of two side surfaces (front and rear surfaces) perpendicularly intersecting with the first direction in which the sensor holder 26 reciprocally moves. On the other hand, a U-shaped hole 25a oblong in the vertical direction is formed at each of positions on the side surfaces of the carriage 25, where the shaft 26a is engaged with. Thus, the sensor holder 26 is supported with respect to the carriage 25 by the two shafts 26a and respective two long holes 25a engaged with each other at two positions. The sensor holder 26 is rotatable within a predetermined angular range centering on an axis perpendicularly intersecting with the moving direction of the carriage 25 in a plane parallel to the sheet S, centering on the shafts 26a with respect to the carriage 25. The sensor holder 26 is movable in a range of the length of the long holes 25a in the vertical direction (in the gravity direction when the printing apparatus 1 is installed on the horizontal plane) with respect to the carriage 25.

While the four rotating members 30 of the carriage 25 are running on the surface of the presser plate 20, rotatably contacting it, the sensor holder 26 rotates and displaces in the vertical direction according to the surface shape of the presser plate 20. In the present specification, this motion according to the surface shape is referred to as equalization.

A virtual line segment passing through the inside of the sensor holder 26 which connects the axial centers of the two shafts 26a passes the vicinity of the center of the light-receiving optical axis (or the vicinity of its extension line) of the light-sensitive element 18b in the sensor unit 18 held by the sensor holder 26. Specifically, when viewed from a side, the two shafts 26a and the light-sensitive element 18b are located right above the reading position of the colorimetric sensor (see FIG. 3). When viewed from the top or a side, the reading position is disposed around the center of the rotating members 30, which cover the upstream and downstream sides of the presser plate 20 in the sheet conveyance direction. With the above-described positional relations, while the carriage 25 is running, the sensor unit 18 can track the sheet S with a small amount of equalization, thus enabling downsizing the reading unit 2.

Figure 5:
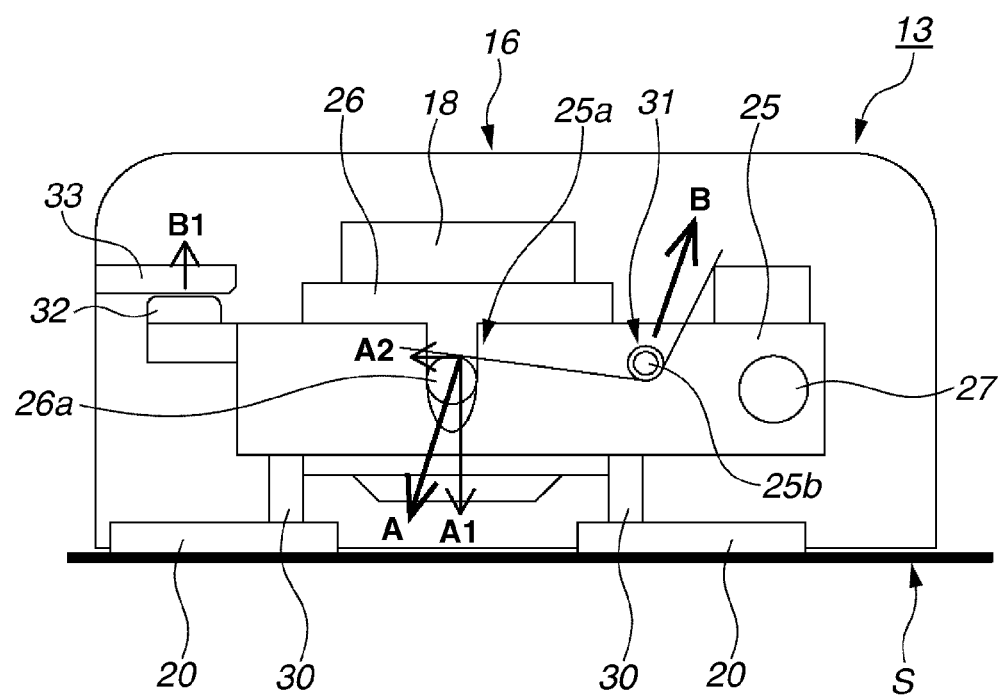
FIG. 5 illustrates balances of forces applied by a spring member.

As illustrated in FIGS. 4 and 5, the two spring members 31 (torsion coil springs) are attached to two positions on the side surfaces of the carriage 25. Each of these torsion coil springs is formed such that two arms are extended centering on the coil center. Each of protrusions 25b formed on side surfaces of the carriage 25 is fit into the coil center of the torsion coil spring. One arm of the spring member 31 contacts the head of the shaft 26a and the other arm thereof contacts a part of the carriage 25.

FIG. 5 illustrates balances of forces applied by the spring member 31. Referring to FIG. 5, a spring force A applied by one arm of the spring member 31 acts on the shaft 26a as a force for pressing and urging the shaft 26a in an obliquely downward direction. The spring force A can be decomposed into a vertical component force A1 and a horizontal component force A2.

The vertical component force A1 acts as a force of the rotating members 30 provided at the bottom of the sensor holder 26 for pressing the presser plate 20. Even if the presser plate 20 is not partially flat, the four rotating members 30 of the carriage 25 are constantly and stably in contact with the presser plate 20 while the carriage 25 is running. Therefore, the inclination and vertical position of the sensor holder 26 change according to the shape of the presser plate 20, thus enabling accurate equalization. The horizontal component force A2 acts as a force for pressing the shaft 26a onto the inner surface of the long hole 25a of the carriage 25. This pressing force eliminates backlash between the shaft 26a and the long hole 25a to improve the positioning accuracy of the sensor holder 26 in the first direction. As a result, even a small test pattern subjected to colorimetry can be accurately read, thus reducing sheet consumption required for colorimetry and improving throughput of colorimetric operations.

On the other hand, a spring force B, a reactive force for the spring force A, applied by the other arm of the spring member 31 acts as a force for pressing in an obliquely upward direction the protrusion 25b formed on the carriage 25. The action of the spring force B produces an angular moment centering on the guide shaft 27 on the carriage 25. The produced angular moment generates a pressing force B1 for pressing the slider 32 attached to the other side of the carriage 25 onto the guide rail 33 provided on the carriage 25. Such a force balance enables the reciprocal motion of the carriage 25 with a stable posture.

As described above, one spring produces forces acting in three different directions to keep balance. The function of equalization for accurately maintaining the relative distance and relative angle between the sensor unit 18 and the sheet S is achieved based on a simple structure with a small number of parts.

Figure 9:
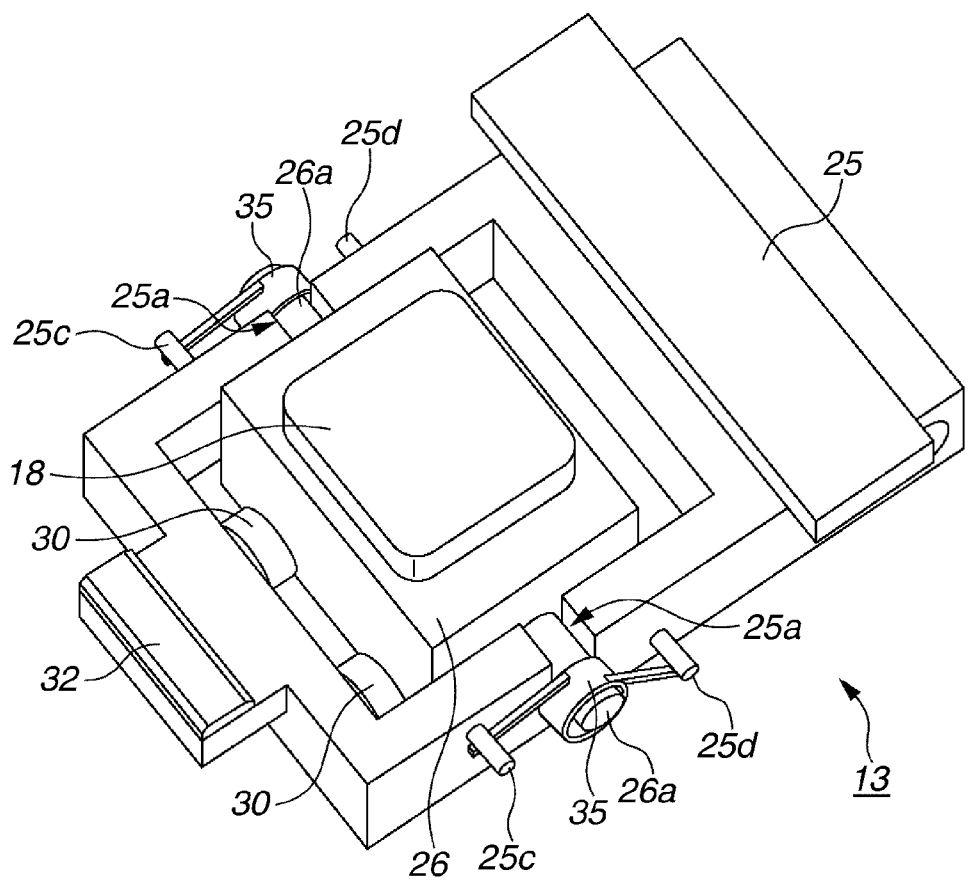
FIG. 9 is a perspective view illustrating a configuration of a scanner unit according to another exemplary embodiment.
Figure 10:
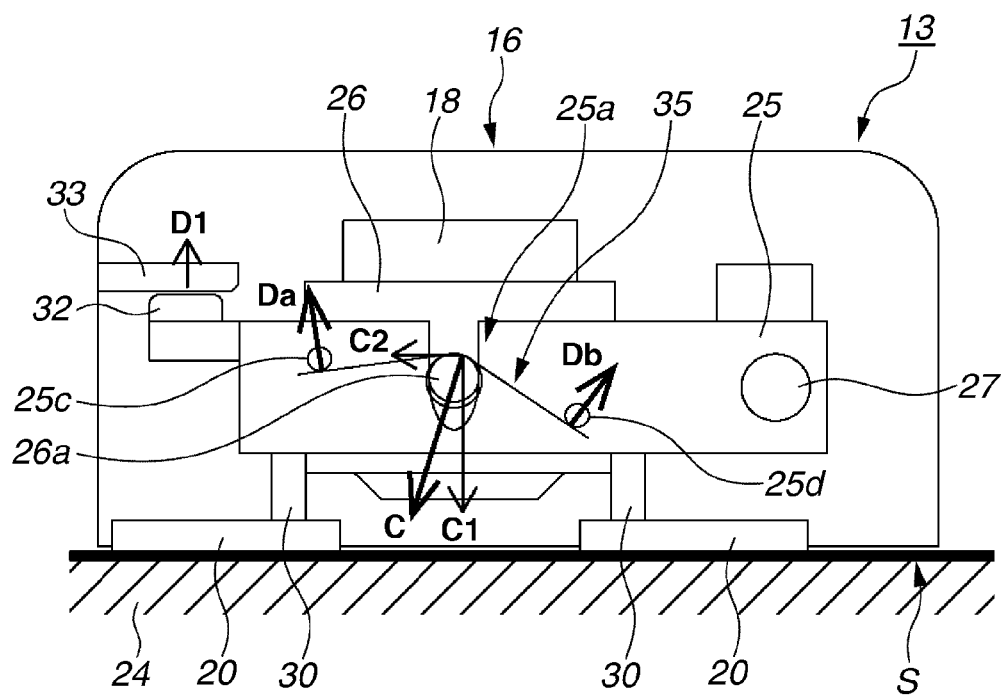
FIG. 10 illustrates balances of urging forces in the scanner unit.

FIGS. 9 and 10 illustrate an example of a modification of the spring member 31 for urging the sensor unit 18 downward with respect to the carriage 25. The configuration of this example is similar to that of the above-described exemplary embodiment except for the spring members, and duplicated descriptions will be omitted.

In this example, spring members 35 (torsion coil springs) are used instead of the above-described spring members 31. Each of these torsion coil springs is formed such that two arms are extended centering on the coil center. Each of the shafts 26a formed on the sensor holder 26 is fit into the coil center of the torsion coil spring. One arm of the spring member 35 contacts the bottom of a protrusion 25c formed on a side surface of the carriage 25, and the other arm thereof contacts the bottom of another protrusion 25d formed on the side surface of the carriage 25.

FIG. 10 illustrates balances of forces applied by the spring member 35. Referring to FIG. 10, a spring force C applied from the coil center of the spring member 35 to the shaft 26a acts on the shaft 26a as a force for pressing and urging the shaft 26a in an obliquely downward direction. The spring force C can be decomposed into a vertical component force C1 and a horizontal component force C2. The vertical component force C1 acts as a force on the rotating members 30 provided at the bottom of the sensor holder 26 for pressing the presser plate 20. The horizontal component force C2 acts as a force for pressing the shaft 26a onto the inner surface of the long hole 25a of the carriage 25.

One arm of the spring member 35 applies a force Da for pressing the protrusion 25c of the carriage 25 in an obliquely upward direction. The other arm of the spring member 35 applies a force Db for pressing the protrusion 25d of the carriage 25 in an obliquely upward direction. These forces produce an angular moment centering on the guide shaft 27 on the carriage 25. The produced angular moment generates a pressing force D1 for pressing the slider 32 onto the guide rail 33.

Figure 6:
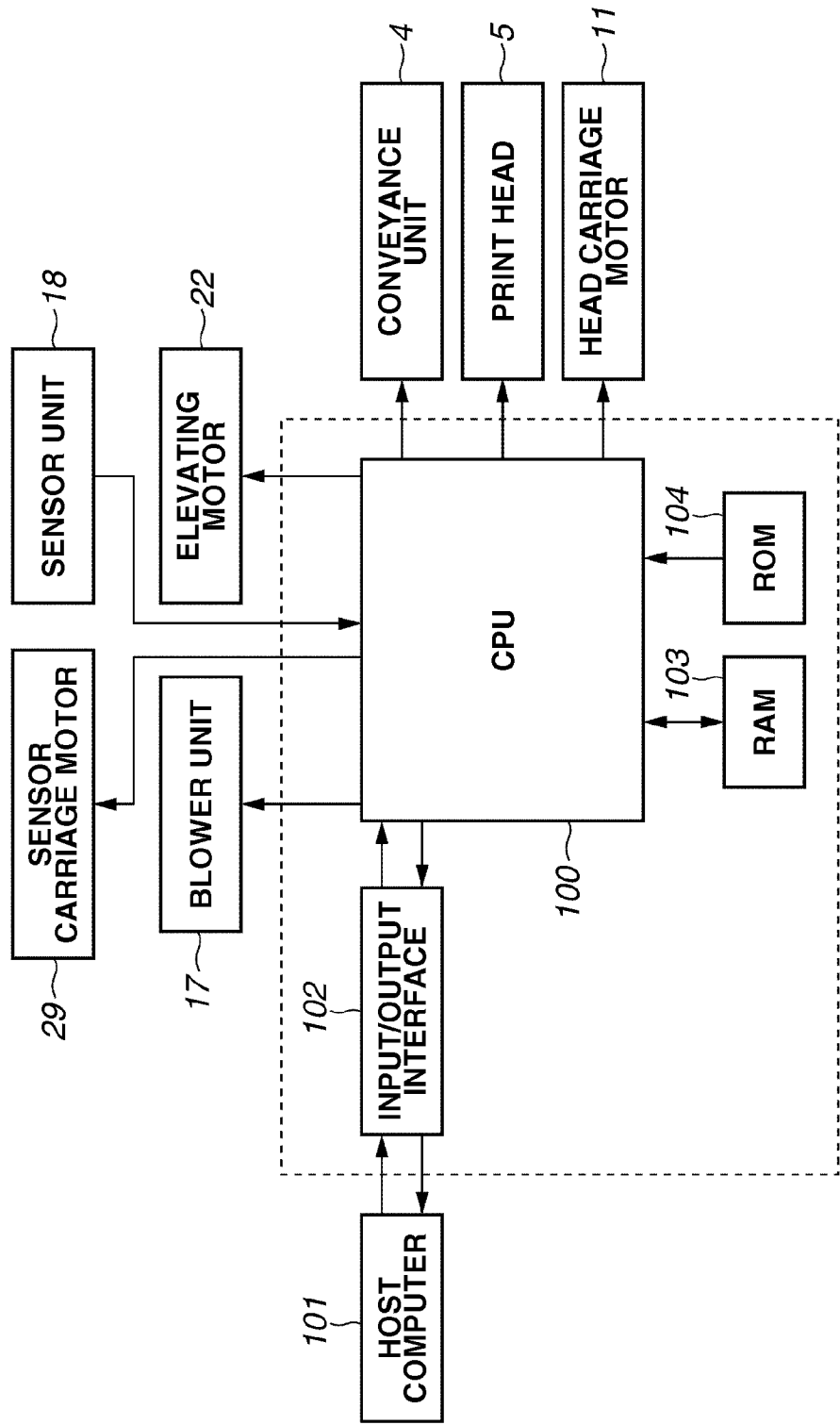
FIG. 6 illustrates a system configuration centering on a control unit.
Figure 8A:
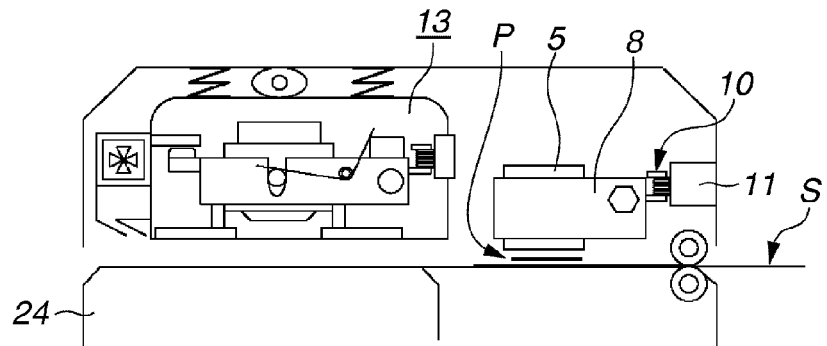
FIGS. 8A, 8B, 8C, and 8D illustrate operating states of the printing apparatus.
Figure 8B:
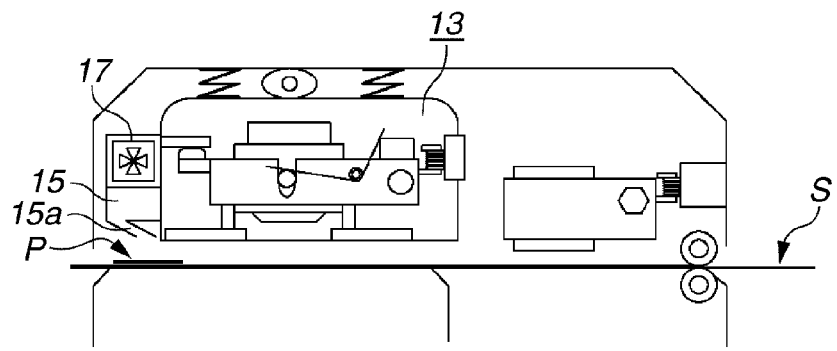
Figure 8C:
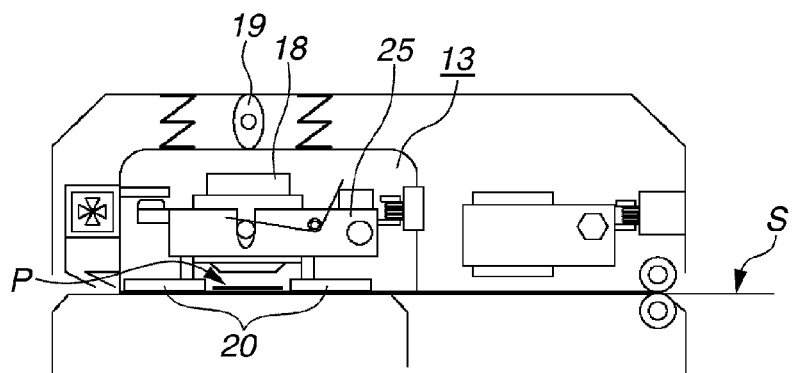
Figure 8D:
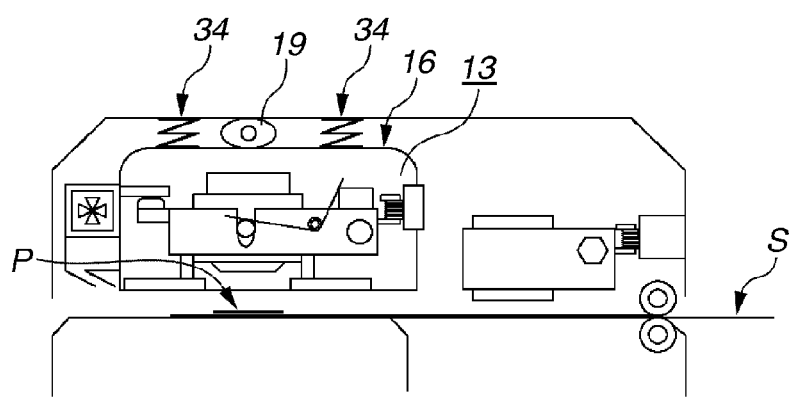

FIG. 6 illustrates a system configuration of the printing apparatus 1 according to the present exemplary embodiment centering on the control unit. The control unit is a computer system including a central processing unit (CPU) 100, an input/output interface 102, a random access memory (RAM) 103, and a read-only memory (ROM) 104. These elements may be configured as an application specific integrated circuit (ASIC). The CPU 100 totally controls print operations, drying operations, read operations, and calibration operations according to a control program stored in the ROM 104. The RAM 103 is used as a work area by the CPU 100 to perform these operations. The CPU 100 inputs from the host computer 101 print data and various setting information via the input/output interface 102. The CPU 100 further controls the drive of a drive motor of the conveyance unit 4, the print head 5, the heard carriage motor 11, the elevating motor 22, the sensor carriage motor 29, and the heater and fan of the blower unit 17. The CPU 100 further inputs a signal acquired by the sensor unit 18, and performs calibration based on the input signal.

Operations performed by the printing apparatus 1 having the above-described configuration to read a test pattern and perform calibration (color calibration) will be described below. FIG. 7 is a flowchart illustrating an operating sequence controlled by the control unit. FIGS. 8A, 8B, 8C, and 8D illustrate operating states of the printing apparatus 1.

In step S1, the CPU 100 supplies a sheet to be used for test. Roll paper and cut paper can be used for the printing apparatus 1 according to the present exemplary embodiment. The conveyance unit 4 conveys a sheet S, inserted from a paper feed port 6, on the platen 7 up to a position under the printing head 5.

In step S2, the CPU 100 prints an image P (a test pattern) on the sheet S. When the leading end of the image forming area of the sheet S is conveyed to the position under the printing head 5, the CPU 100 discharges ink from the print head 5, while reciprocally moving the carriage 8, to print an image for one band on the sheet S. The CPU 100 forms the image P (the test pattern for calibration) including a plurality of rows as a test pattern on the sheet S based on the serial print process, in which step-feeding of the sheet S for one band and image printing for one band are alternately repeated (the state illustrated in FIG. 8A). The present exemplary embodiment is not limited to the serial print process. A test pattern may be formed based on the line print process by using line heads.

In step S3, the CPU 100 conveys the printed sheet S to the drying unit 14. Upon completion of the image P print process, the CPU 100 proceeds to the drying process before the image reading process to promote the dryness of ink applied to the sheet S. The CPU 100 performs such a forced drying process to shorten the time until colors of the image P formed on the sheet S are stabilized. As described above, the reading unit 2 includes the scanner unit 13 and the drying unit 14 disposed downstream of the scanner unit 13. The CPU 100 conveys the sheet S until the area of the image P formed on the sheet S skips the scanner unit 13 and reaches the drying unit 14. The CPU 100 conveys the sheet S until the rear end area of the test pattern reaches under the air outlet 15a of the drying unit 14 (the state illustrated in FIG. 8B).

In step S4, the CPU 100 forcibly dries the area in which the test pattern is formed. Warm air generated by the blower unit 17 passes through the duct 15 and then is blown off from the air outlet 15a onto the sheet S. While conveying the sheet S in the reverse direction at low speed, the image P is forcibly dried from the rear end toward the leading end. When drying the entire image P, the sheet S may be conveyed in the forward direction, not in the reverse direction.

In step S5, to read the image P, the CPU 100 back-feeds the sheet S. The CPU 100 conveys the sheet S in the reverse direction until the rear end of the area of the image P of the reading unit 2 reaches the reading position directly under the sensor unit 18 of the scanner unit 13. In steps S1 to S5, the reading unit 2 is in the raised state where the presser plate 20 is separated from the backing 24, allowing the sheet S to freely move within the interval.

In step S6, the elevating mechanism changes the reading unit 2 from the raised state to the lowered state to press the sheet S. The housing 16 is lowered by the rotation of the elevating cams 19, and the presser plate 20 and the backing 24 pinch the sheet S to press the sheet S (the state illustrated in FIG. 8C).

In step S7, before reading for colorimetry, the CPU 100 performs sensor calibration for the reading characteristics of the sensor unit 18. Values read by the sensor unit 18 may change depending on the environment and aging, causing changes in colorimetric values. Therefore, prior to actual reading in step S8, the CPU 100 calibrates the sensor unit 18.

Specifically, the CPU 100 moves the carriage 25 to an end of the side on which the color calibration member 34 is disposed, and detects the optical characteristics (colors) of the color calibration member 34 via the sensor unit 18. Then, the CPU 100 performs sensor calibration based on the result of the measurement. In sensor calibration, the CPU 100 corrects data of the detection result so that the measurement result at the time of colorimetry of the color calibration member 34 serves as intended reference values. Alternatively, the luminous intensity of the light sources 18a and the gain of the light-sensitive element 18b included in the sensor unit 18 may be adjusted so that intended output values are acquired. Sensor calibration in step S7 does not need to be performed each time, and may be performed once every predetermined number of times. For example, sensor calibration may be performed before reading the color patch in a plurality of rows, and then subsequently omitted.

In step S8, the CPU 100 reads a part (one row) of the test pattern on the sheet S via the scanner unit 13. Moving together with the movement of the carriage 25 in the second direction, the sensor unit 18 reads one row of the test pattern on the surface of the sheet S to acquire color information. When the presser plate 20 moves, even if the surface of the presser plate 20 is not partially flat, the sensor unit 18 minutely displaces in the rotational or vertical direction by the equalization function. Therefore, the reading position is maintained constant, ensuring high accuracy reading.

In step S9, the elevating mechanism changes the reading unit 2 from the lowered state to the raised state to release the pressing on the sheet S. The housing 16 is raised by the rotation of the elevating cams 19 and the force of the spring members 50, and the presser plate 20 is separated from the supporting surface of the backing 24 to release the pressing on the sheet S (the state illustrated in FIG. 8D).

In step S10, the CPU 100 determines whether there is any unread test pattern, i.e., whether the reading unit 2 has read all of test patterns. When the CPU 100 determines that there is any unread test pattern (YES in step S10), the processing returns to step S5. Otherwise, when the CPU 100 determines that there is no unread test pattern (NO in step S10), the processing proceeds to step S11.

Thus, the CPU 100 reads the test pattern formed in a plurality of rows by repeating the one-row read sequence via the sensor unit 18 and the sheet step-feed sequence. In the one-row read sequence, the presser plate 20 and the supporting surface of the backing 24 are pressed on each other. In the step-feed sequence, the pressing is released.

In step S11, the CPU 100 feeds the sheet S from which all of test patterns have been read in the forward direction to discharge the sheet S to the outside of the printing apparatus 1.

In step S12, the CPU 100 performs color-related calibration processing. The CPU 100 acquires information about colors of the test pattern based on the data obtained in pattern reading in step S8. Then, the control unit performs color calibration for adjusting the amount of ink applied by the print heads for respective colors so that desired colors are reproduced in the final print product.

The above-described sequences are operations performed in a mode of color calibration. When printing a desired regular image, not a test pattern, the reading operation is not required and, therefore, steps S5 to S10 and S12 are omitted.

The configuration and operation of the printing apparatus 1 required to perform calibration of the characteristics of the sensor unit 18 in step S7 will be described below.

Figure 11:
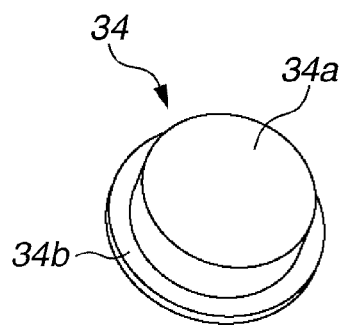
FIG. 11 illustrates the shape of a calibration member.

When calibrating the sensor unit 18, the calibration member 34 composed of a white plate having a shape illustrated in FIG. 11 is used. The calibration member 34 has a white reference surface 34a where the color and reflectance are strictly managed, and a fixing fringe 34b. The CPU 100 moves the carriage 25 to an end, detects the optical characteristics (colors) of the reference surface 34a via the sensor unit 18, and performs sensor calibration based on the result of the measurement.

When the printing apparatus 1 is assembled in a factory, the electrical characteristics of the sensor unit 18 are adjusted according to the calibration member 34 to be used, before shipment. When replacing the sensor unit 18 for maintenance, the calibration member 34 also needs to be replaced at the same time. Accordingly, with the calibration member 34 held by the holder 35, the holder 35 is detachably attached to the printing apparatus 1. Thus, the calibration member 34 can be easily replaced.

Figure 12A:
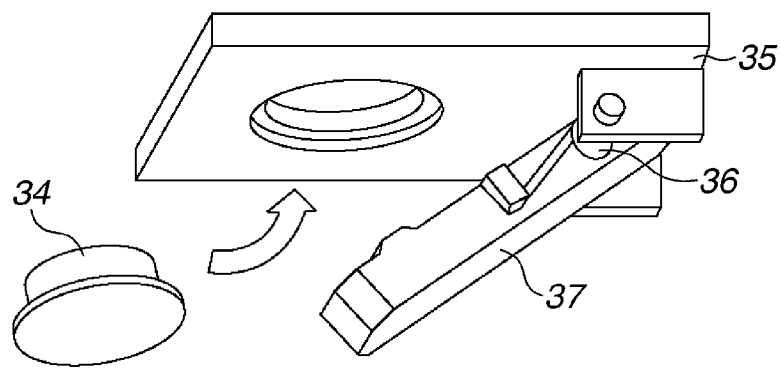
FIGS. 12A, 12B, and 12C illustrate a structure for attaching the calibration member to a holder.
Figure 12B:
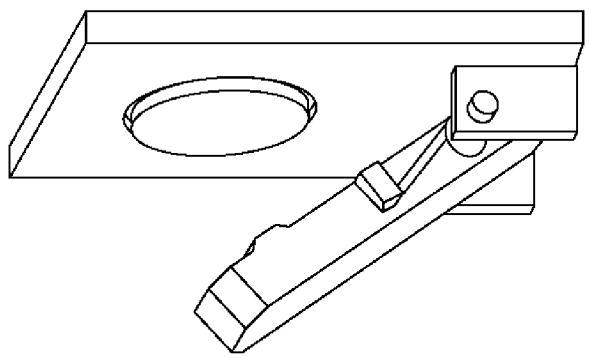
Figure 12C:
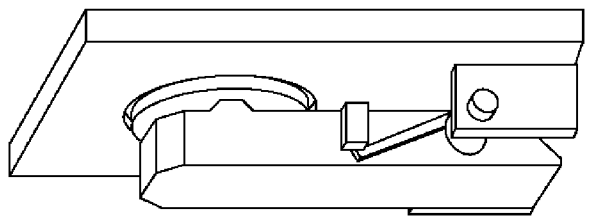

FIGS. 12A, 12B, and 12C illustrate a structure for attaching the calibration member 34 to the holder 35. With the reference surface 34a of the calibration member 34 inserted into a round hole of the holder 35, an arm 37 is set to hold the calibration member 34. A spring 36 applies a rotational urging force to the arm 37 in the direction in which it closes. A worker opens the arm 37 against the urging force, and then inserts the calibration member 34 into the round hole of the holder 35 (see FIG. 12A). The fringe 34a of the calibration member 34 contacts the holder 35, and the calibration member 34 is held not to come off. Then, the worker releases the arm 36 (see FIG. 12B). The urging force of the spring 36 presses the calibration member 34 onto the holder 35 to fix the calibration member 34 (see FIG. 12C).

Figure 13A:
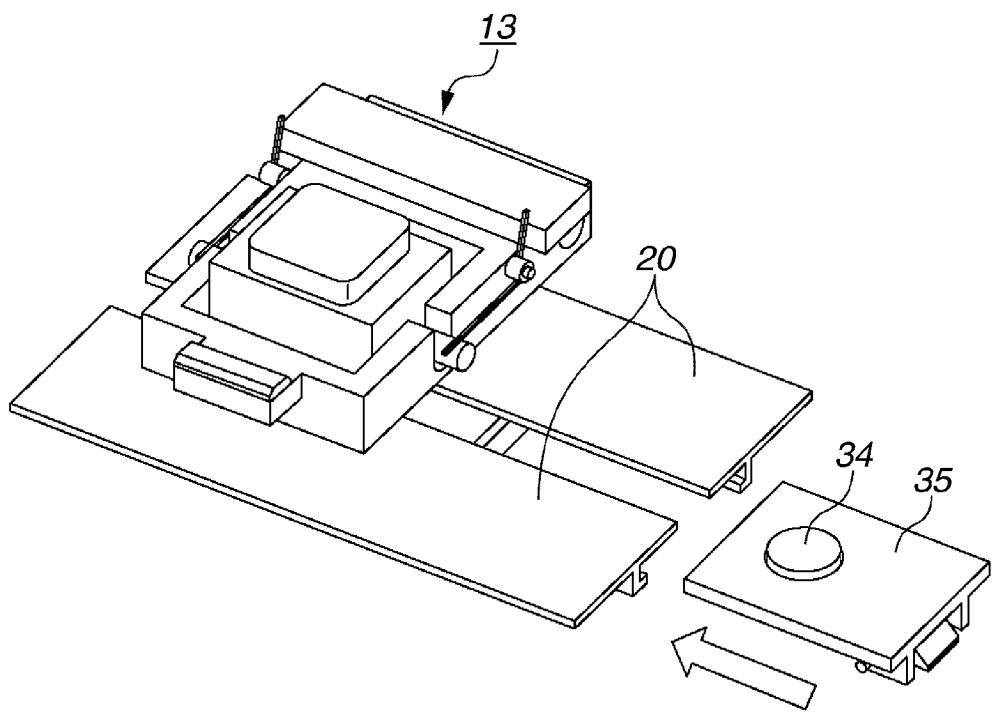
FIGS. 13A and 13B are perspective views illustrating a state where the holder is attached to the printing apparatus.
Figure 13B:
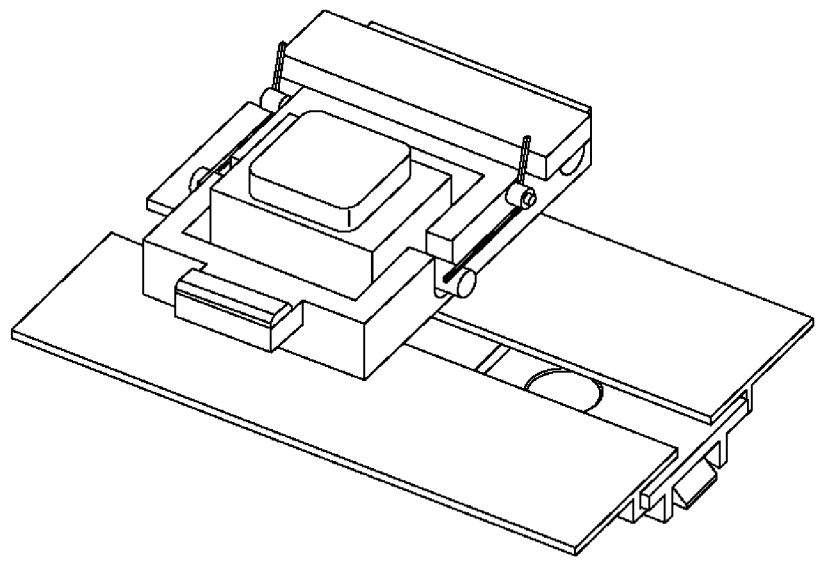

The holder 35 assembled in this way is slidably inserted from the lateral direction into a slit formed between the two presser plates 20 of the printing apparatus 1, and then fixed, as illustrated in FIGS. 13A and 13B. FIG. 13A illustrates a state before the holder 35 is inserted. FIG. 13B illustrates a state where the holder 35 is inserted and fixed.

Figure 14:
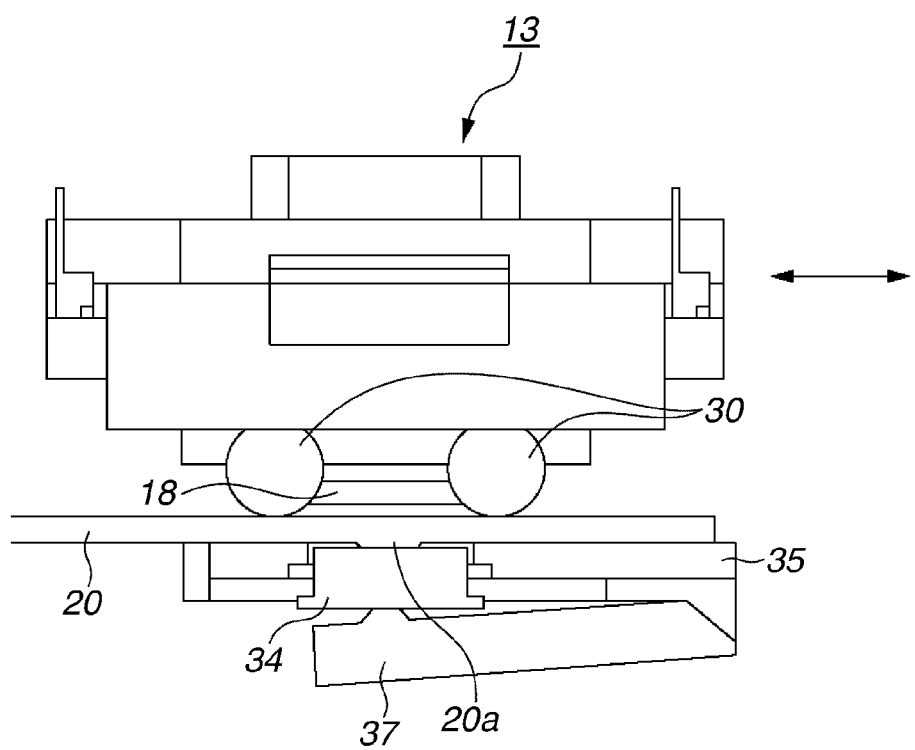
FIG. 14 is across sectional view illustrating a state where the holder is inserted into the printing apparatus.

FIG. 14 is across sectional view illustrating a state where the holder 35 is inserted into the printing apparatus 1, when viewed from the first direction. The reference surface 34a of the calibration member 34 contacts the surface (bottom surface) of the presser plate 20 on which it presses the sheet S. In other words, the calibration member 34 is sandwiched by the presser plate 20 and the arm 37. A contact portion 20a of the presser plate 20 contacting the calibration member 34 has a convex portion. The reference surface 34a of the calibration member 34 contacts the convex portion.

Thus, the sheet S subjected to reading and the calibration member 34 are positioned with respect to an identical reference, i.e., the bottom surface of the presser plate 20. Therefore, the positional relation between the sensor unit 18 and the calibration member 34 during sensor calibration approximately equals the positional relation between the sensor unit 18 and the sheet S during test pattern reading in the height direction, thus enabling detecting the optical characteristics of the calibration member 34 with high accuracy. In addition, the top surface of the presser plate 20 on which the rotating members 30 supporting the scanner unit 13 run can be made flat, thus stabilizing the running. Further, as illustrated in FIG.

14, the width of the holder 35 in the second direction is larger than the interval between the four rotating members 30 in the second direction. Since the flexible presser plate 20 is received by the holder 35 having a wide width, the posture of the sensor unit 18 is stabilized during colorimetry of the calibration member 34.

Figure 15:
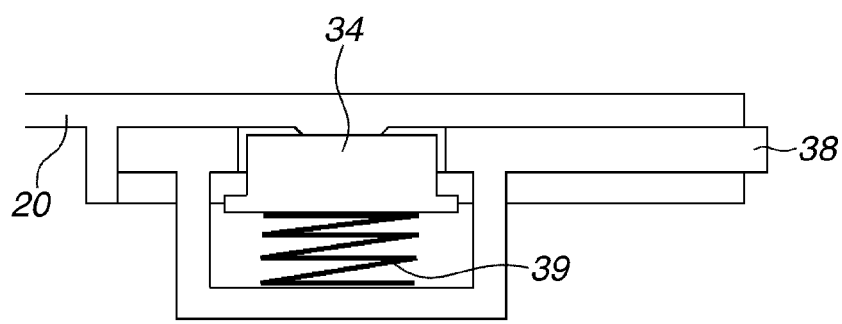
FIG. 15 illustrates a configuration of a modification of the example illustrated in FIG. 14.

As a modification, instead of the spring 36 and the arm 37 illustrated in FIG. 12A, a spring 39 is provided in a holder 38, as illustrated in FIG. 15. With this structure, the spring 39 itself presses the calibration member 34 onto the presser plate 20 from its back surface.

Figure 16:
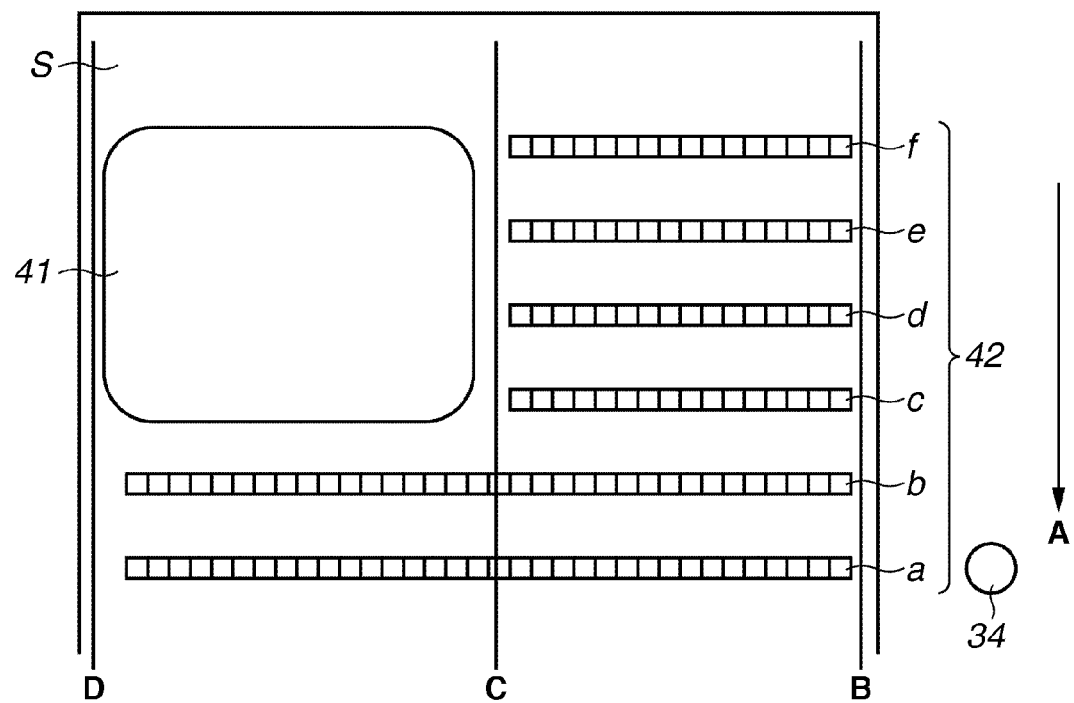
FIG. 16 illustrates an example of a test pattern formed on a sheet.

FIG. 16 illustrates an example of a test pattern formed on the sheet S. The test pattern is formed of a number of color patches 42 and a sample image 41 for comparison before and after color calibration. The layout of the color patches 42 and the sample image 41 can be freely set by the user.

In this example, the color patches 42 are formed in six rows (rows a to f) in a conveyance direction A (back feed direction) of the sheet S. The row f is a patch row on the most downstream side (the leading edge side of a sheet). The printing unit 3 forms the test pattern in order of the rows f to a. The rows a and b are formed almost over the entire sheet width, i.e., a range from position B to position D. Subsequent rows c, d, e, and f are printed over about a half of the sheet width, i.e., a range from position B to position C. The sample image 41 is formed over the remaining sheet width, i.e., a range from position C to position D.

The reading unit 2 reads the color patches 42 formed in this layout in order of the rows a to f one by one, by repeating step-feeding (back feed). The home position of the carriage 25 exists on the position B side.

The sheet S on which the test pattern is formed by the printing unit 3 is back-fed until the first row a reaches the reading position directly under the slit of the presser plate 20. At this timing, the reading unit 2 is set to the raised state (the pressing released). Subsequently, the CPU 100 sets the reading unit 2 to the lowered state (pressing position) to press the sheet S between the presser plate 20 and the supporting surface of the backing 24. The CPU 100 reads the patches in the row a one by one from position B to position D via the sensor unit 18 while moving the carriage 25 from position B to position D for scanning. Subsequently, the CPU 100 sets the reading unit 2 to the raised state, and then step-feeds the sheet S in the back feed direction by the distance of one patch row. Then, the CPU 100 sets the reading unit 2 to the lowered state again, and then reads the patches in the row b one by one from position D to position B via the sensor unit 18 while moving the carriage 25 from position D to position B for scanning. When the read sequence for the row b is completed, the CPU 100 sets the reading unit 2 to the raised state, and then step-feeds the sheet S in the back feed direction.

The scanning direction of the read sequence alternately changes for each row in this way. As described above, the scanning direction of the read sequence for each patch row may be constantly the same direction (from position B to position D). In this case, the CPU 100 performs the operation for returning the carriage 25 to the home position (on the position B side) while step-feeding the sheet S.

When subsequently reading the patches in the rows c and d, the CPU 100 sets the scanning range to the distance corresponding to the length of each patch row in the sheet width direction. The CPU 100 sets the reading unit 2 to the lowered state, and then reads the patches in the row c one by one from position B to position C via the sensor unit 18 while moving the carriage 25 from position B to position C for scanning. Subsequently, the CPU 100 sets the reading unit 2 to the raised state, and then step-feeds the sheet S in the back feed direction. Then, the CPU 100 sets the reading unit 2 to the lowered state, and then reads the patches in the row d one by one from position C to position B via the sensor unit 18 while moving the carriage 25 from position C to position B for scanning. When the read sequence for the row d is completed, the CPU 100 sets the reading unit 2 to the raised state, and then step-feeds the sheet S in the back feed direction.

Thus, the CPU 100 can shift to the following row without scanning the area of the sample image 41 not subjected to colorimetry, thus improving the reading throughput. Further, since the carriage 25 does not move on the sample image 41, the contact members 8 do not strongly press the sample image 41 via the flexible presser plate 20, thus reducing any damage of the sample image 41.

When subsequently reading the patches in the rows e and f, similar to the above-described sequences, the CPU 100 sets the scanning range to the distance corresponding to the length of each patch row in the sheet width direction. However, in this example, after the read sequence for the row e, the CPU 100 performs sensor calibration processing for maintaining constant the reading characteristics of the sensor which may change with the temperature. In the sensor calibration processing, the CPU 100 reads the color information for the surface of the calibration member 34 via the sensor unit 18, and then adjusts the sensor or corrects the sensor output so that correct results of reading are obtained.

The CPU 100 sets the reading unit 2 to the lowered state, and then reads the patches in the row e one by one from position B to position C via the sensor unit 18 while moving the carriage 25 from position B to position C for scanning. In this case, the CPU 100 performs the sensor calibration processing before the read sequence for the row f. Since the calibration member 34 is disposed on the position B side, it is necessary to move the sensor unit 18 to the calibration member 34. The CPU 100 sets the reading unit 2 to the raised state, and then moves the carriage 25 from position C to position B, and further up to the calibration member 34 outside while step-feeding the sheet S in the back feed direction. Then, the CPU 100 sets the reading unit 2 to the lowered state, and then reads the surface of the calibration member 34 via the sensor unit 18 to acquire color information. The control unit performs the sensor calibration processing based on the acquired color information. Upon completion of the sensor calibration processing, similar to the above-described sequences, the CPU 100 reads the patches one by one in the last row f from position B to position C, returns the carriage 25 to the home position, and terminates the series of processing.

Upon completion of the read sequences for all of patch rows, the control unit performs color calibration for adjusting the amount of ink applied by the print heads for respective colors so that desired colors are reproduced in the final print product.

According to the above-described exemplary embodiments, the total throughput and reading accuracy in the read sequences for a test pattern formed in a plurality of rows are improved. Specifically, the present exemplary embodiment achieves both a reduction in the total calibration time and an improvement in the reading accuracy of the printing apparatus 1. As a result, the calibration time, which is an unproductive time for a user of the printing apparatus 1, can be shortened. The user can use more time for image printing, which is an intended purpose, thus improving the productivity in printing operations.

Particularly in the present exemplary embodiment, a simply-structured reading apparatus not having a complicated configuration, such as a link mechanism, is capable of reading information on a sheet with high accuracy. In addition, the ability to read even a small-sized test pattern (information subjected to reading) on the sheet S with high accuracy enables acquiring actions and effects such as the reduced amount of sheets required for inspection and the reduced amount of sheet conveyance, thus reducing inspection time.

The present exemplary embodiment provides a reading apparatus capable of calibrating with high accuracy the reading characteristics of the sensor for reading information on a sheet, and the printing apparatus 1 including the reading apparatus.

Particularly in the present exemplary embodiment, the scanner unit 13 includes the presser plate 20 for pressing the supporting surface supporting the sheet S, and the carriage 25 holding the sensor unit 18 and reciprocally moving on the presser plate 20, and the presser plate 20 and the carriage 25 are integrated into one unit. Thus, since the entire reading unit 2 including the presser plate 20 retracts from the sheet S to allow sheet conveyance, the sheet conveyance operation can be started regardless of the position of the carriage 25 on the presser plate 20. This remarkably contributes to the improvement in the total throughput in processing for reading the test pattern by repeating the read and step-feed sequences.

In addition, since the rotating members 30 are constantly on the presser plate 20 without level differences, no impact occurs while they are moving. Therefore, a sensor failure due to the degraded attachment accuracy of the sensor unit 18 is not likely to occur, maintaining high reading accuracy for a prolonged period of time.

Further, in the present exemplary embodiment, in repetitive read and step-feed (back feed) sequences, during the read and step-feed sequences for one row, a sheet area having another row to be subsequently read is dried by the drying unit 14. In processing for reading the test pattern by repeating three sequences (dry, read, and step-feed sequences), the read and step-feed processing and the drying processing are performed in parallel, i.e., overlapped in time sequence, thus remarkably improving the total throughput.

Further, in the present exemplary embodiment, there is no conveyance roller on the downstream side of the printing unit 3, and the test pattern is read by repeating the step-feed (back feed) sequence. The test pattern printed by the printing unit 3 is not nipped by the conveyance roller at least until the read sequence by the scanner unit 13 is completed. Therefore, regardless of the length of the formed test pattern in the conveyance direction, the test pattern is not damaged or the conveyance roller is not stained by ink before reading, thus ensuring high-accuracy read operations for a prolonged period of time.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-257425 filed Nov. 25, 2011, which is hereby incorporated by reference herein in its entirety.

What is claimed is:

1. A reading apparatus comprising:
a presser plate providing a reading slit, configured to press a sheet to be read onto a supporting surface, the presser plate being made of a flexible plate member having lower stiffness than the supporting surface;
a sensor unit configured to read information on the sheet through the reading slit, and
a carriage holding the sensor unit, configured to move along a surface of the presser plate while contacting the presser plate,
wherein the carriage includes an equalizing mechanism configured to hold the sensor unit so as to allow the sensor unit to displace with respect to the carriage to follow the surface of the presser plate, and
wherein the equalizing mechanism allows the sensor unit to displace with respect to the carriage in a rotational direction centering on a shaft parallel to a moving direction of the carriage and disposed above the reading slit, and in a vertical direction.

2. The reading apparatus according to claim 1, wherein the equalizing mechanism includes a mechanism in which a shaft is engaged with a vertically long hole on each of two side surfaces perpendicularly intersecting with the moving direction, and
wherein the shaft is rotatable with respect to the engaged long hole and is movable in the vertical direction.

3. The reading apparatus according to claim 2, wherein the long hole is upwardly open and U-shaped, and provided with an elastic member for urging the shaft in a downward direction of the long hole.

4. The reading apparatus according to claim 1, wherein the presser plate includes first and second portions extending in a direction parallel to the moving direction of the carriage, and disposed on respective side across the reading slit, and
wherein, a bottom of the sensor unit is provided with a first contact member which contacts a surface of the first portion when the carriage moves, and a second contact member which contacts a surface of the second portion when the carriage moves.

5. The reading apparatus according to claim 4, wherein each of the first and second contact members is a rotating member which contacts the surface of the presser plate to be rotatably driven.

6. The reading apparatus according to claim 4, wherein both the reading slit and the shaft are disposed between the first and second contact members as viewed from above.

7. The reading apparatus according to claim 4, wherein the sensor unit includes a light source configured to emit light toward the sheet, and a light-sensitive element configured to receive light from a surface of the sheet, and
wherein the center of a light-receiving optical axis of the light-sensitive element is disposed between the first and second contact members as viewed from above.

8. The reading apparatus according to claim 7, wherein a calibration member having an optical characteristic detectable by the sensor unit is attached with reference to the presser plate, and
wherein the sensor unit detects the optical characteristic of the calibration member to calibrate a reading characteristic of the sensor unit based on a result of detection of the optical characteristic.

9. The reading apparatus according to claim 1, wherein the carriage, the presser plate and the equalizing mechanism are integrated into a single unit, and
wherein the reading apparatus further comprises an elevating mechanism configured to move the single unit up and down toward the supporting surface with respect to the carriage.

10. The reading apparatus according to claim 9, wherein the single unit further integrally includes a drying unit configured to promote dryness of ink applied to the sheet before reading.

11. A printing apparatus comprising:
a printing unit configured to print a test pattern on a sheet; and
the reading apparatus according to claim 1 configured to read the test pattern printed on the sheet by the printing unit.

12. The printing apparatus according to claim 11, wherein a conveyance roller for conveying the sheet is disposed upstream of the printing unit, and no conveyance roller is disposed downstream of the printing unit.

13. The printing apparatus according to claim 11, wherein the test pattern formed in a plurality of rows is read by repeating a one-row read sequence via the sensor unit and a sheet step-feed sequence, and
  wherein the presser plate and the supporting surface are pressed on each other in the one-row read sequence, and the pressing between the presser plate and the supporting surface is released in the sheet step-feed sequence.

14. The printing apparatus according to claim 13, wherein the sheet on which the test pattern is formed by the printing unit is conveyed until an area having the formed pattern passes a reading area of the sensor unit, and subsequently, the sensor unit reads the test pattern while the sheet is being conveyed in a reverse direction.

\* \* \* \* \*